(12) United States Patent
Yun et al.

(10) Patent No.: US 10,349,126 B2
(45) Date of Patent: Jul. 9, 2019

(54) METHOD AND APPARATUS FOR FILTERING VIDEO

(71) Applicant: Samsung Electronics Co., Ltd., Suwon-si, Gyeonggi-do (KR)

(72) Inventors: Ji-hwan Yun, Suwon-si (KR); Min-seo Kim, Seoul (KR); Jae-yun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/813,752

(22) Filed: Nov. 15, 2017

(65) Prior Publication Data

US 2018/0176641 A1 Jun. 21, 2018

(30) Foreign Application Priority Data

Dec. 19, 2016 (KR) .................. 10-2016-0173624
Oct. 11, 2017 (KR) .................. 10-2017-0131643

(51) Int. Cl.
*H04N 7/16* (2011.01)
*G06F 3/00* (2006.01)
(Continued)

(52) U.S. Cl.
CPC ... *H04N 21/44016* (2013.01); *G06K 9/00718* (2013.01); *G06K 9/00751* (2013.01); *G06N 3/08* (2013.01); *G06N 5/025* (2013.01); *H04N 21/23418* (2013.01); *H04N 21/234345* (2013.01); *H04N 21/44008* (2013.01); *H04N 21/4532* (2013.01); *H04N 21/4542* (2013.01);
(Continued)

(58) Field of Classification Search
CPC ....... H04N 21/44016; H04N 21/23418; H04N 21/234345; H04N 21/4532; G06K 9/00718; G06K 9/00751; G06N 3/08; G06N 5/025; G06N 5/027
See application file for complete search history.

(56) References Cited

U.S. PATENT DOCUMENTS

2002/0097984 A1* 7/2002 Abecassis .............. G11B 19/02
386/344
2002/0147782 A1 10/2002 Dimitrova et al.
(Continued)

FOREIGN PATENT DOCUMENTS

CN          102360422 A      2/2012
KR    10-2009-0057596 A      6/2009
(Continued)

*Primary Examiner* — Kyu Chae
(74) *Attorney, Agent, or Firm* — Jefferson IP Law, LLP

(57) ABSTRACT

An artificial intelligence (AI) system for simulating functions such as recognition, determination, and so forth of a human brain by using a mechanical learning algorithm such as deep learning, or the like, and an application thereof are provided. A method of filtering video by a device is provided. The method includes selecting at least one previous frame preceding a current frame being played from among a plurality of frames included in the video, generating metadata regarding the selected at least one previous frame, predicting harmfulness of at least one next frame to be displayed on the device after playback of the current frame, based on the generated metadata, and filtering the next frame based on the predicted harmfulness.

19 Claims, 13 Drawing Sheets

(51) Int. Cl.
  *G06F 13/00*    (2006.01)
  *H04N 5/445*    (2011.01)
  *H04N 21/44*    (2011.01)
  *H04N 21/234*   (2011.01)
  *H04N 21/2343*  (2011.01)
  *G06K 9/00*     (2006.01)
  *G06N 5/02*     (2006.01)
  *G06N 3/08*     (2006.01)
  *H04N 21/45*    (2011.01)
  *H04N 21/454*   (2011.01)
  *H04N 21/466*   (2011.01)
  *H04N 21/475*   (2011.01)
  *H04N 21/84*    (2011.01)

(52) U.S. Cl.
  CPC ....... *H04N 21/466* (2013.01); *H04N 21/4755* (2013.01); *H04N 21/84* (2013.01); *G06N 5/027* (2013.01)

(56) References Cited

U.S. PATENT DOCUMENTS

2007/0168853 A1\* 7/2007 Jarman ................ G11B 27/105
                                                    715/205
2009/0274364 A1   11/2009 Shakya et al.
2009/0288131 A1\* 11/2009 Kandekar ......... G06F 17/30029
                                                    725/133
2015/0221097 A1   8/2015 Yu et al.
2016/0057497 A1   2/2016 Kim et al.

FOREIGN PATENT DOCUMENTS

KR      10-1010523 B1    1/2011
KR      10-1062672 B1    9/2011

\* cited by examiner

METHOD AND APPARATUS FOR FILTERING VIDEO

CROSS-REFERENCE TO RELATED APPLICATION(S)

This application claims the benefit under 35 U.S.C. § 119(a) of a Korean patent application filed on Dec. 19, 2016 in the Korean Intellectual Property Office and assigned Serial number 10-2016-0173624, and of a Korean patent application filed on Oct. 11, 2017 in the Korean Intellectual Property Office and assigned Serial number 10-2017-0131643, the entire disclosure of each of which is hereby incorporated by reference.

TECHNICAL FIELD

The present disclosure relates to a method and apparatus for filtering video. More particular, the present disclosure relates to an apparatus and method for filtering video to be played according to prediction of harmful or undesired content.

BACKGROUND

An artificial intelligence (AI) system is a computer system that implements human-level intelligence, and allows a machine to learn by itself, make a decision, and become smart unlike an existing rule-based smart system. As the AI system is used, the AI system has an improved recognition rate and accurately understands user's preference, such that the existing rule-based smart system is gradually replaced with a deep-learning-based AI system.

An AI technology includes machine learning (deep learning) and element technologies using machine learning.

Machine learning is an algorithm technique that classifies/learns characteristics of input data by itself, and an element technology is a technology that simulates a function such as recognition, decision, etc., of a human brain by using a machine-learning algorithm such as deep learning, and includes technical fields such as linguistic understanding, visual understanding, inference/prediction, knowledge representation, operation control, and so forth.

The AI technology employs various fields. For example, linguistic understanding is a technique that recognizes, and applies/processes human languages/texts, and includes natural language processing, machine interpretation, a conversation system, question and answer, voice recognition/synthesis, and so forth. Visual understanding is a technique that recognizes and processes an object in the same manner as a human visual system, and includes object recognition, object tracking, image search, people recognition, scene understanding, space understanding, image enhancement, etc. Inference/prediction is a technique that determines information and performs logical inference and prediction, and includes knowledge/probability-based inference, optimization prediction, preference-based planning/recommendation, and so forth. Knowledge representation is a technique that automatizes human experience information as knowledge data, and includes knowledge establishment (data creation/classification), knowledge management (data utilization), and the like. Operation control is a technique that controls autonomous driving of a vehicle and motion of a robot, and includes motion control (navigation, collision, driving), manipulation control (action control), and so forth.

Deep learning may also be used for a device to filter a harmful image included in video, such that a need exists for a deep learning technique for effectively filtering a harmful image a user does not desire to watch.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for filtering video.

In accordance with an aspect of the present disclosure, a method of filtering video by a device is provided. The method includes selecting at least one previous frame preceding a current frame being played from among a plurality of frames included in the video, generating metadata regarding the selected at least one previous frame, predicting harmfulness of at least one next frame to be displayed on the device after playback of the current frame, based on the generated metadata, and filtering the next frame based on the predicted harmfulness.

In accordance with another aspect of the present disclosure, a device for filtering video is provided. The device includes a display configured to display the video, a memory configured to store at least one instruction, and at least one processor configured, by executing the at least one instruction, is configured to: select at least one previous frame preceding a current frame being played from among the plurality of frames included in the video, generate metadata regarding the selected previous frame, predict harmfulness of at least one next frame to be displayed on the device after playback of the current frame, based on the generated metadata, and filter the next frame based on the predicted harmfulness.

In accordance with another aspect of the present disclosure, a non-transitory computer-readable recording medium has recorded thereon a program which, when executed by a computer, performs the method according to the first aspect of the embodiment.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
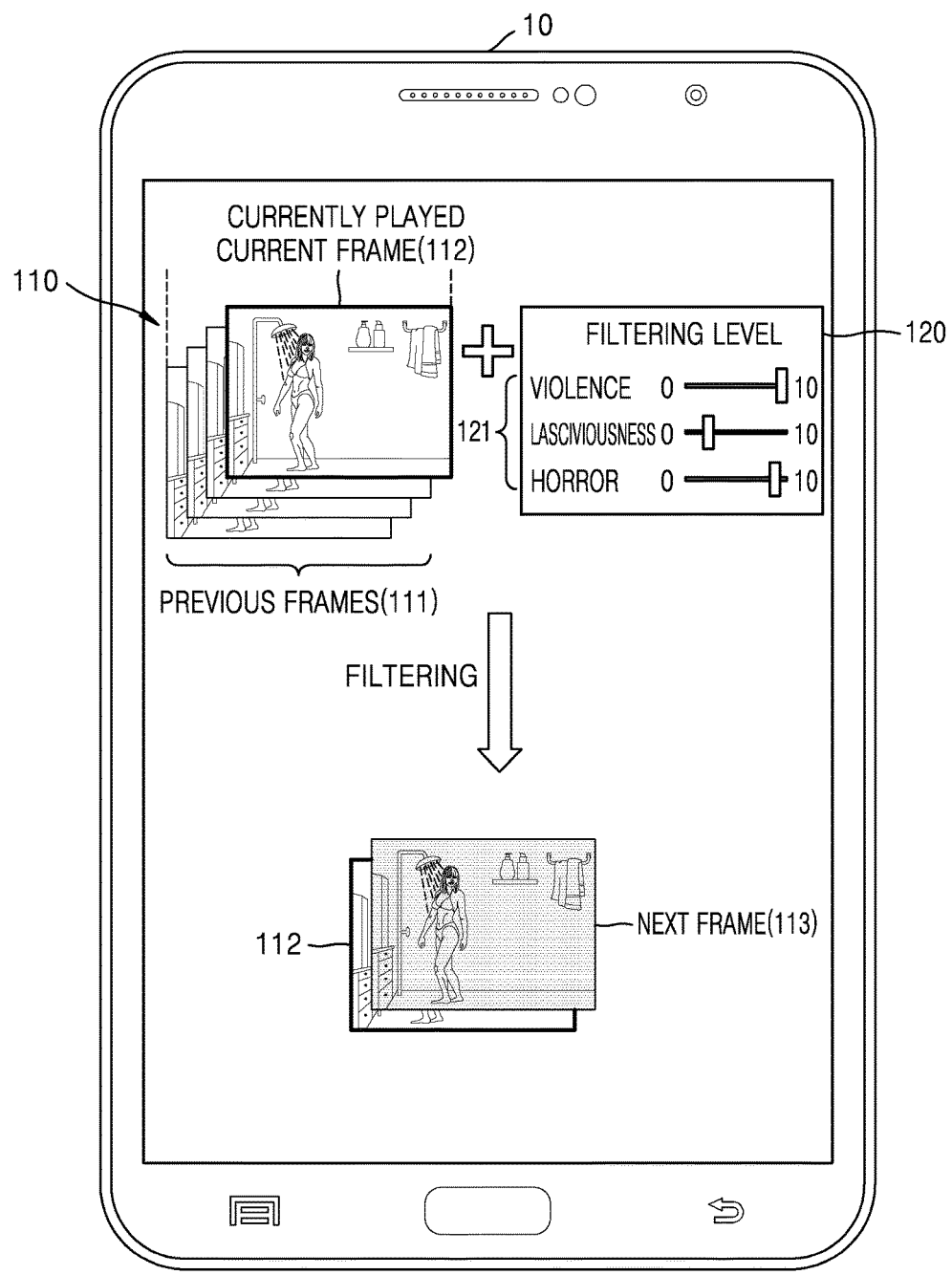
FIG. 1 illustrates an example where a device filters video according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Some embodiments of the present disclosure may be represented by block components and various process operations. All or some of such functional blocks may be implemented by various numbers of hardware and/or software components which perform specific functions. For example, functional blocks of the present disclosure may be implemented with one or more microprocessors or circuit elements for a specific function. The functional blocks of the present disclosure may also be implemented with various programming or scripting languages. Functional blocks may be implemented as an algorithm executed in one or more processors. Furthermore, the present disclosure may employ any number of conventional techniques for electronics configuration, signal processing and/or control, data processing and the like. The term "mechanism", "element", "means", or "component" is used broadly and is not limited to mechanical or physical embodiments.

Connecting lines or connecting members between elements shown in the drawings are intended to merely illustrate functional connections and/or physical or circuit connections. In an actual device, connections between elements may be indicated by replaceable or added various functional connections, physical connections, or circuit connections.

Hereinafter, the present disclosure will be described with reference to the accompanying drawings.

FIG. 1 illustrates an example where a device filters video according to an embodiment of the present disclosure.

Referring to FIG. 1, a device 10 may filter a frame including harmful content from frames included in video 110 being played in the device 10. In an embodiment, a user of the device 10 may preset a type of harmful content (e.g., violence, lasciviousness, and horror) and a filtering level used to filter the content, and the device 10 may expect harmfulness of a frame to be displayed after playback of a current played frame based on a type of harmful content to be filtered and a filtering level specific to the type of the harmful content and perform filtering.

For example, if the user does not desire to view a lascivious scene of the video 110, the user may set a low filtering level for a 'lasciviousness' category to make the lascivious scene easily filtered, and if the device 10 determines that a frame to be displayed after playback of a currently played frame includes a lascivious scene, the device 10 may filter the frame to be displayed.

In an embodiment, frame filtering lowers visibility of harmful content included in a frame and may include processing the frame by using an image filter. For example, the device 10 may filter a frame including harmful content by blurring or darkening the entire region of the frame or a partial region thereof where the harmful content is displayed.

In an embodiment, frames included in the video 110 may be classified into a current frame 112 currently played on the device 10, at least one previous frames 111 displayed on the device 10 before the current frame 112, and at least one next frames 113 to be displayed on the device 10 after playback of the current frame 112. However, a classification criterion of the frames is not limited to this example.

The device 10 may expect harmfulness of the next frame 113 to be displayed on the device 10 after playback of the current frame 112, by analyzing the previous frames 111. In an embodiment, harmfulness of the next frame 113 may be expected for each of a plurality of categories 121 related to harmfulness. For example, the plurality of categories 121 may include 'violence', 'lasciviousness', and 'horror', and the device 10 may expect harmfulness of the next frame 113 for each of the 'violence', 'lasciviousness', and 'horror' categories.

In an embodiment, the device 10 filters the next frame 113 by comparing a level (not shown) of the expected harmfulness of the next frame 113 with a preset filtering level 120. A harmfulness level (not shown) indicates an extent to which harmful content is included in the next frame 113, and for example, the harmfulness level (not shown) may be set to an integer value and if the device 10 determines that the harmfulness of the next frame 113 has the highest level, the device 10 may expect the harmfulness level (not shown) of the next frame 113 as 10. The filtering level 120 indicates a level of harmful content of the next frame 113, which causes filtering of the next frame 113, and may be set in a range similar with a range in which the harmfulness level (not shown) may be set. For example, if the harmfulness level (not shown) is set to an integer value of 0 through 10, the filtering level 120 may also be set to an integer value of 0 through 10. When the filtering level 120 is set to 7, the next frame 113 may be determined to be filtered if the harmfulness level (not shown) is set to an integer value of 7 through 10.

In an embodiment, if harmfulness of the next frame 113 is expected for each of the plurality of categories 121, the device 10 may filter the next frame 113 by comparing the harmfulness level (not shown) and the filtering level 120 for the same category with each other.

In an embodiment, the device 10 may filter the next frame 113 if the expected harmfulness level (not shown) of the next frame 113 is higher than or equal to the preset filtering level 120. For example, if the harmfulness level of the next frame 113 for the 'lasciviousness' category is expected as 9 and thus is higher than the filtering level 120 for the 'lasciviousness' category, which is set to 8, then the device 10 may filter the next frame 113.

The device 10 may be, for example, but not limited to, a smart phone, a tablet personal computer (PC), a smart television (TV), a personal digital assistant (PDA), a laptop, a media player, a micro server, a global positioning system (GPS) device, an electronic book (e-Book) terminal, a digital broadcasting terminal, a navigation system, a kiosk, an Moving Picture Experts Group phase 1 or phase 2 (MPEG-1 or MPEG-2) audio layer 3 (MP3) player, a digital camera, a wearable device, and other mobile or non-mobile computing devices. The device 10 may also include various devices capable of receiving a touch input, such as an electronic board, a touch table, or the like. The device 10 may also be a watch, glasses, a hair band, or a ring, which has a communication function and a data processing function.

Figure 2:
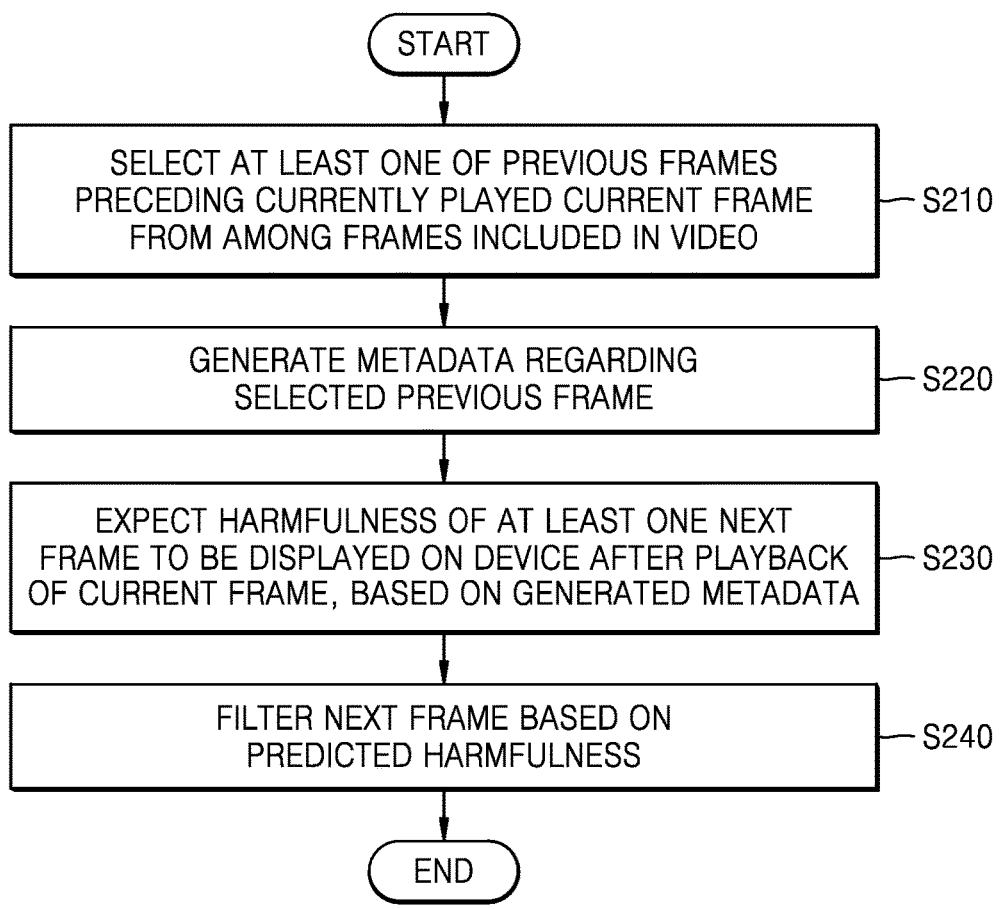
FIG. 2 is a flowchart of a method of filtering video by a device according to an embodiment of the present disclosure.

FIG. 2 is a flowchart of a method of filtering video by a device according to an embodiment of the present disclosure.

Referring to FIG. 2, in operation S210, the device 10 selects at least one of previous frame preceding a currently played current frame from among frames included in video. In an embodiment, the device 10 may select a plurality of adjacent previous frames having similarity, based on a data variation between adjacent previous frames included in the video. The device 10 may receive the video from an external device or a server. The video may be input to the device 10 through a camera, etc., of the device 10.

In operation S220, the device 10 generates metadata regarding the selected previous frame. The metadata may include information for determining harmfulness of a next frame. In an embodiment, the device 10 may generate the metadata based on at least one of image information, speech information, and text information included in the selected previous frame.

For example, the device 10 may extract image characteristics of the selected previous frame, recognize speech included in the selected previous frame, and use scenario information of video including the previous frame, thereby generating information about the number of persons included in the previous frame, a gender of a person, an action of a person, a facial expression of a person, an emotional state of a person, and a skin color exposure degree as the metadata. However, a type of the metadata is not limited to the above example.

In an embodiment, the device 10 may determine a partial region of the selected previous frame as a harmful region including the harmful content. The device 10 generates metadata regarding the harmful region that is the partial region of the previous frame. The device 10 generates metadata by extracting image characteristics of the partial region of the selected previous frame.

In operation S230, the device 10 expects harmfulness of at least one next frame to be displayed on the device 10 after playback of the current frame, based on the generated metadata.

In an embodiment, the device 10 expects harmfulness of the next frame for each of a plurality of categories related to harmfulness. For example, the plurality of categories may include 'violence', 'lasciviousness', and 'horror', and the device 10 may expect harmfulness of the next frame for each of the 'violence', 'lasciviousness', and 'horror' categories.

In operation S240, the device 10 filters the next frame based on the expected harmfulness. In an embodiment, the device 10 filters the next frame by comparing an expected harmfulness level of the next frame with a preset filtering level. If the harmfulness of the next frame is expected for each of the plurality of categories, the device 10 may filter the next frame by comparing the harmfulness level and the filtering level for the same category with each other. In an embodiment, the device 10 filters the next frame if the expected harmfulness level of the next frame is higher than or equal to a preset filtering level.

In an embodiment, the device 10 filters the next frame by using an image filter. For example, the device 10 may filter the next frame by blurring or darkening the entire region of the next frame or a partial region thereof where the harmful content is displayed.

The device 10 may display the filtered next frame on the device 10. The device 10 may transmit the filtered next frame to an external device or an external server.

Figure 3:
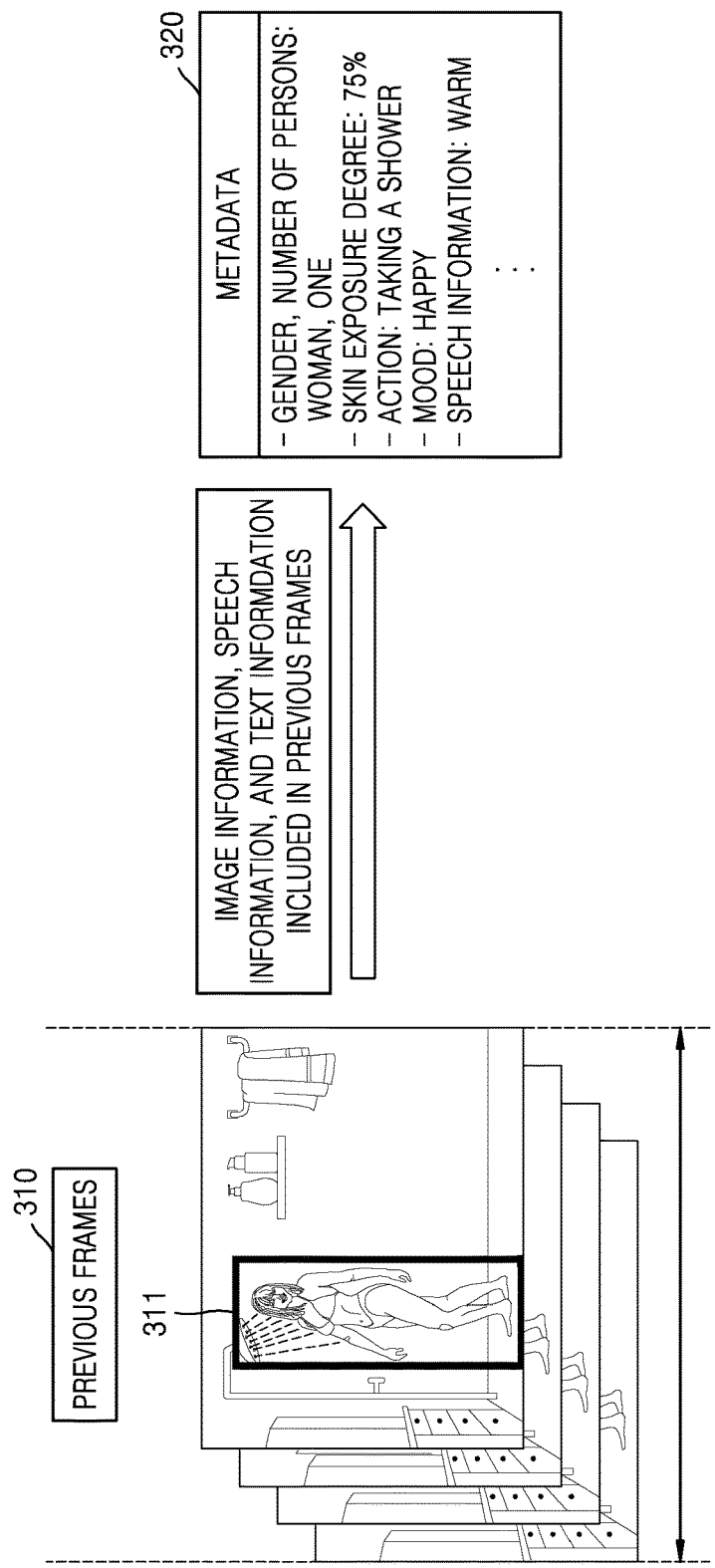
FIG. 3 illustrates metadata regarding previous frames according to an embodiment of the present disclosure.

FIG. 3 illustrates metadata regarding previous frames according to an embodiment of the present disclosure.

Referring to FIG. 3, metadata 320 regarding previous frames 310 may include information for determining harmfulness of a next frame. In an embodiment, the device 10 may generate the metadata 320 based on at least one of image information, speech information, and text information included in the selected previous frame. However, the metadata 320 shown in FIG. 3 is provided for convenience of description, and the metadata 320 generated by the device 10 is not limited to the description.

To generate the metadata 320 regarding the selected previous frames 310, the device 10 may use autocorrelation, a scale-invariant feature (SIFT) method, and a speeded-up robust features (SURF) algorithm as a method for extracting image characteristics of the previous frames 310. The device 10 may use a speech recognition algorithm such as dynamic time warping (DTW), hidden Markov modelling (HMM), a neural network, etc., to generate the metadata regarding the selected previous frames 310. The device 10 may generate the metadata 320 by using scenario and script information regarding video. However, the present disclosure is not limited thereto, and data capable of indicating image characteristics included in a frame and being used to distinguish attributes of images may be included in the metadata.

In an embodiment, the device 10 may extract image characteristics of the selected previous frames 310, recognize speech included in the selected previous frames 310, and use scenario information of video including the previous frames 310, thereby generating information about the number of persons included in the previous frames 310, a gender of a person, an action of a person, a facial expression of a person, an emotional state of a person, and a skin color exposure degree as the metadata.

For example, if the previous frames 310 show scenes for preparing for taking a shower, the device 10 may generate, as the metadata 320 regarding the previous frames 310, 'a gender, the number of persons: woman, one, a skin exposure degree: 75%, an action: taking off clothes, a mood: happy, speech information: "Warm.", scenario information: a shower scene'.

In an embodiment, the device 10 may determine a partial region of the selected previous frames 310 as a harmful region 311 including harmful content. The device 10 generates the metadata 320 for determining harmfulness of the harmful region 311.

Figure 4:
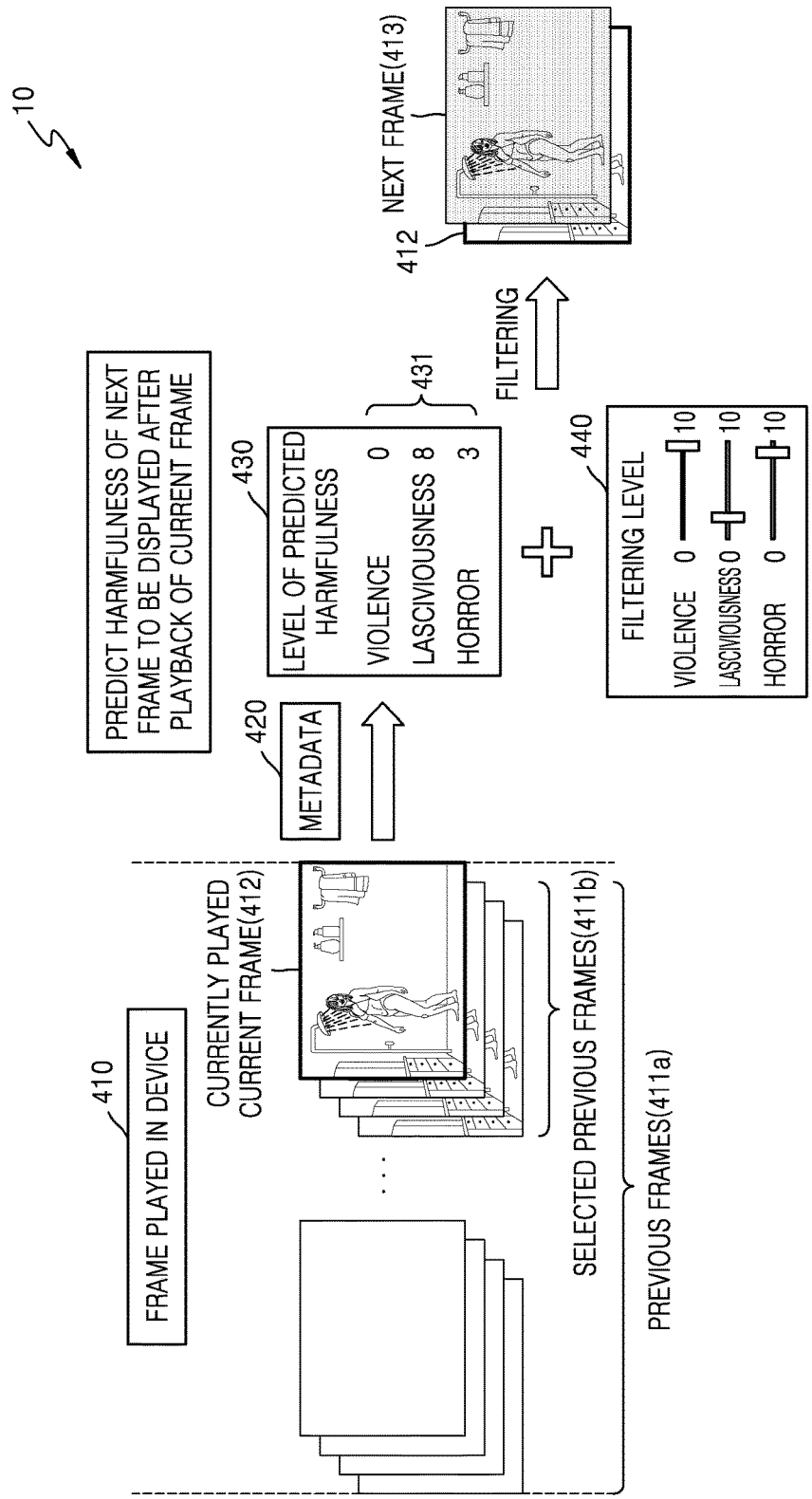
FIG. 4 illustrates an example where a device compares a harmfulness level with a filtering level to filter video according to an embodiment of the present disclosure.

FIG. 4 illustrates an example where a device compares a harmfulness level with a filtering level to filter video according to an embodiment of the present disclosure.

Referring to FIG. 4, frames 410 played on the device 10 may include previous frames 411a and a currently played current frame 412.

The device 10 may select at least one of the previous frames 411a preceding the current frame 412. In an embodiment, the device 10 may select a plurality of adjacent previous frames 411b having similarity, based on a data variation between adjacent previous frames 411a.

The device 10 generates metadata 420 regarding the selected previous frames 411b. In an embodiment, the device 10 may generate the metadata 420 based on at least one of image information, speech information, and text information included in the selected previous frames 411b.

The device 10 extracts image characteristics of the selected previous frames 411b, thus generating, as metadata, information about the number of persons included in the selected previous frames 411b, a gender of a person, an action of a person, a facial expression of a person, and a skin color exposure degree. For example, the device 10 may generate, as the metadata 420 regarding the selected previous frames 411b, information indicating 'one woman, a skin color exposure degree of 80%, during a shower, a happy facial expression'.

The device 10 expects harmfulness of at least one next frame 413 based on the generated metadata 420. In an embodiment, the device 10 may expect harmfulness of the next frame 413 for each of a plurality of categories 431 related to harmfulness. In an embodiment, the plurality of categories 431 may include 'violence', 'lasciviousness', and 'horror', and the device 10 may expect harmfulness of the next frame 413 for each of the 'violence', 'lasciviousness', and 'horror' categories. For example, if the metadata 420 regarding the selected previous frames 411b includes 'one woman, a skin color exposure degree of 80%, during a shower, a happy facial expression', and thus includes information indicating lasciviousness, but does not include information indicating 'violence' or 'horror', then the device 10 may expect violence: 0, lasciviousness: 8, horror: 3' as the harmfulness level of the next frame 413 for each category.

The device 10 determines whether to filter the next frame 413 by comparing an expected harmfulness level 430 with a preset filtering level 440. In an embodiment, if harmfulness of the next frame 413 is expected for each of the plurality of categories 431, the device 10 may filter the next frame 413 by comparing the harmfulness level 430 and the filtering level 440 for the same category with each other. For example, if the harmfulness level 430 of the next frame 413 for the 'lasciviousness' category is expected as 8 and the filtering level 440 for the 'lasciviousness' category is set to 3, then the harmfulness level 430 is higher than the filtering level 440 and thus the device 10 filters the next frame 413.

Meanwhile, the device 10 adds a new category to a preset harmfulness-related category based on a user input. In an embodiment, if a new category for expectation is added, the device 10 filters the next frame 413 by comparing the harmfulness level 430 and the filtering level 440 of the next frame 413 for the same category with each other.

The device 10 changes the filtering level 440 for each category based on the user input. In an embodiment, if the filtering level 440 for a particular category is changed by the user input, the device 10 filters the next frame 413 by comparing the harmfulness level 430 and the filtering level 440 for the particular category with each other.

The device 10 filters the next frame 413 by comparing the expected harmfulness level 430 of the next frame 413 with the preset filtering level 440. For example, the device 10 may filter the next frame 413 by blurring the entire region of the next frame 413.

In an embodiment, the device 10 filters a preset number of next frames. For example, the device 10 may filter a preset number of next frames by blurring the preset number of next frames.

Figure 5A:
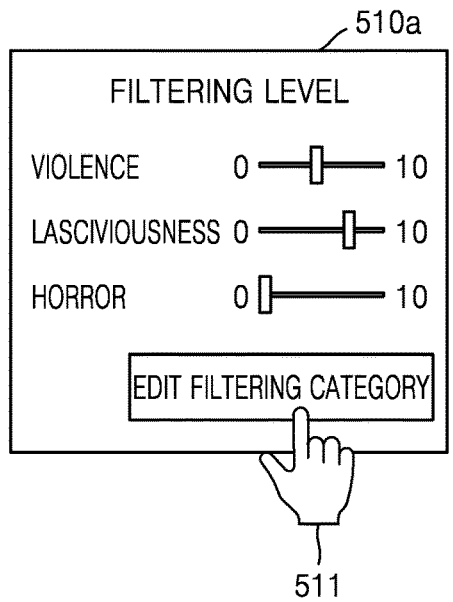
FIGS. 5A, 5B, and 5C illustrate examples where a filtering level is set according to various embodiments of the present disclosure.
Figure 5B:
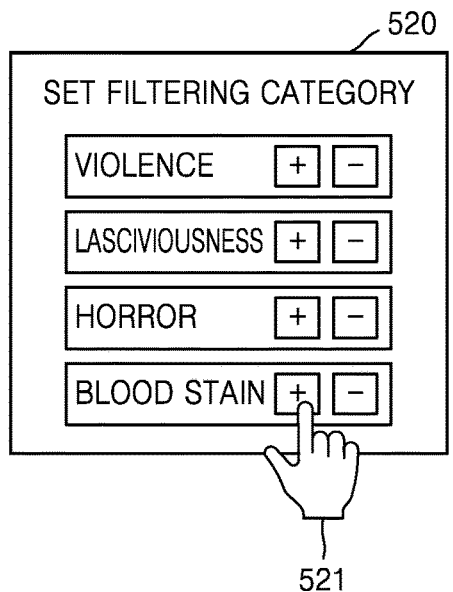
Figure 5C:
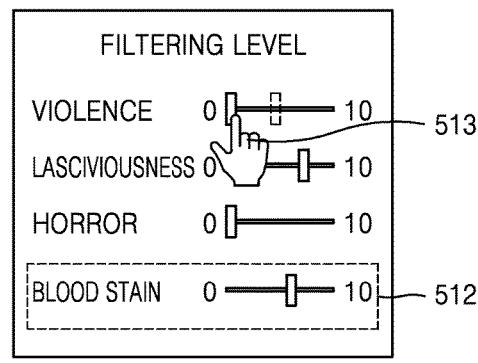

FIGS. 5A to 5C illustrate examples where a filtering level is set according to various embodiments of the present disclosure.

Referring to FIGS. 5A to 5C, the device 10 provides graphic user interfaces (GUIs) 510a, 410b, and 520 for setting a category for expectation of harmfulness of a next frame.

Referring to FIG. 5A, the device 10 receives a user input 511 for setting a category of harmfulness through the GUI 510a to expect the harmfulness of the next frame.

Referring to FIG. 5B, the device 10 provides the GUI 520 in response to the user input 511 for setting a category of harmfulness. In an embodiment, the device 10 provides a list of preset categories and newly added categories through the GUI 520. For example, in addition to preset categories 'violence', 'lasciviousness', and 'horror', the device 10 may provide a new category 'blood stain' through the GUI 520.

In an embodiment, the device 10 may receive a user input 521 for adding the new category 'blood stain'. In an embodiment, the device 10 may receive a user input (not shown) for excluding the categories being preset to expect harmfulness through the GUI 520.

Referring to FIG. 5C, the device 10 provides the GUI 410b in response to the user input 521 for adding a new category. For example, the device 10 may add a 'blood stain' category 512 to the categories for expecting harmfulness in response to the user input 521 for adding the new category 'blood stain'. The device 10 provides a list of the preset 'violence', 'lasciviousness', and 'horror' categories and the newly added 'blood stain' category 512 through the GUI 410b.

The device 10 changes a preset filtering level for a category based on a user input 513. For example, the device 10 may receive the user input 513 for changing a filtering level of the 'violence' category from '5' to '0'.

The device 10 may filter a next frame by comparing a harmfulness level and a filtering level for a newly added category. The device 10 may filter the next frame by comparing the changed filtering level and harmfulness level for the particular category with each other.

Figure 6:
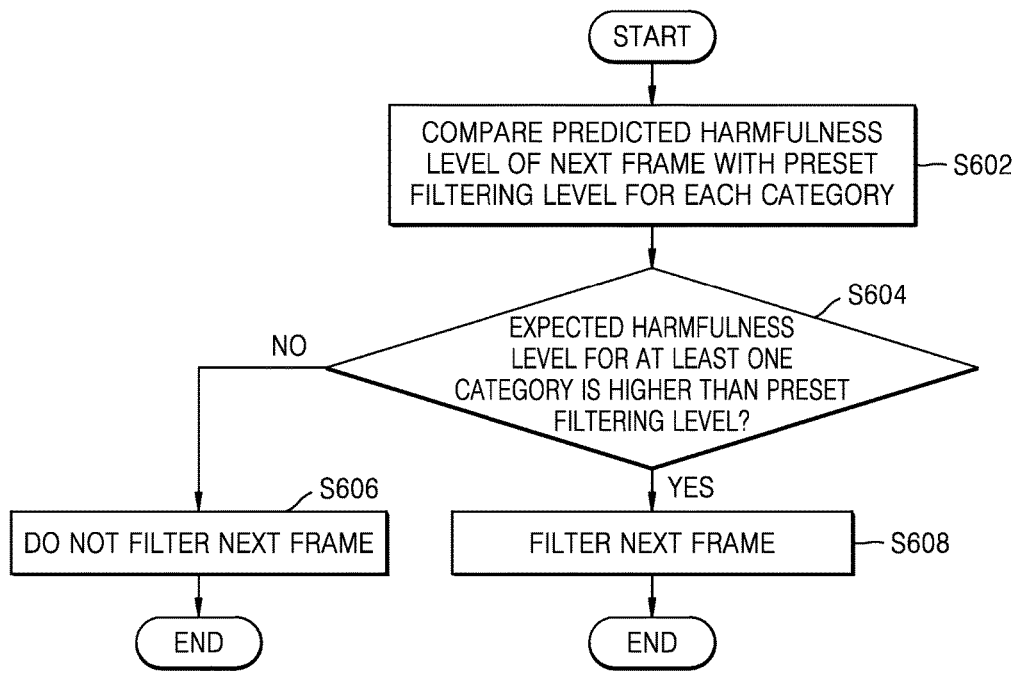
FIG. 6 is a flowchart of a method of comparing an expected harmfulness level of a next frame with a preset filtering level according to an embodiment of the present disclosure.

FIG. 6 is a flowchart of a method of comparing an expected harmfulness level of a next frame with a preset filtering level according to an embodiment of the present disclosure.

Referring to FIG. 6, in operation S602, the device 10 compares an expected harmfulness level of a next frame with a preset filtering level. In an embodiment, the device 10 may compare an expected harmfulness level of the next frame with a preset filtering level for each of a plurality of categories related to harmfulness. For example, the device 10 may compare an expected harmfulness level of a next frame for the 'lasciviousness' category with a preset filtering level for the 'lasciviousness' category.

The expected harmfulness level of the next frame may differ from category to category, and the preset filtering level may also differ from category to category. For example, if the user does not desire to watch a lascivious scene of video, the user may set a low filtering level for the 'lasciviousness' category and a high filtering level for the 'violence' and 'horror' categories.

The harmfulness level of the next frame may also be determined based on metadata generated using previous frames. For example, if information 'one woman, a skin color exposure degree of 80%, during a shower, a happy facial expression' is generated as metadata, the device 10 may determine a high harmfulness level of the next frame for the 'lasciviousness' category and a low harmfulness level of the next frame for the 'violence' and 'horror' categories.

In operation S604, the device 10 determines whether an expected harmfulness level for at least one category is higher than a preset filtering level. If determining that the harmfulness level for the 'lasciviousness' category is higher than the filtering category for the 'lasciviousness' category as a result of expectation of the harmfulness level of the next frame to be played, the device 10 proceeds to operation S608. If the expected harmfulness level for the 'lasciviousness' category is not higher than the filtering level for the 'lasciviousness' category, the device 10 proceeds to operation S606.

In operation S604, the device 10 determines whether expected harmfulness levels for two or more categories are higher than preset filtering levels or expected harmfulness levels for arbitrarily combined categories are higher than preset filtering levels. For example, the device 10 may filter the next frame if harmfulness levels for both the 'violence' category and the 'horror' category are higher than preset filtering levels.

If determining in operation S604 that an expected harmfulness level for at least one category is not higher than a preset filtering level, the device 10 goes to operation S606 not to filter the next frame.

If determining in operation S604 that an expected harmfulness level for at least one category is higher than a preset filtering level, the device 10 goes to operation S608 not to filter the next frame.

Figure 7:
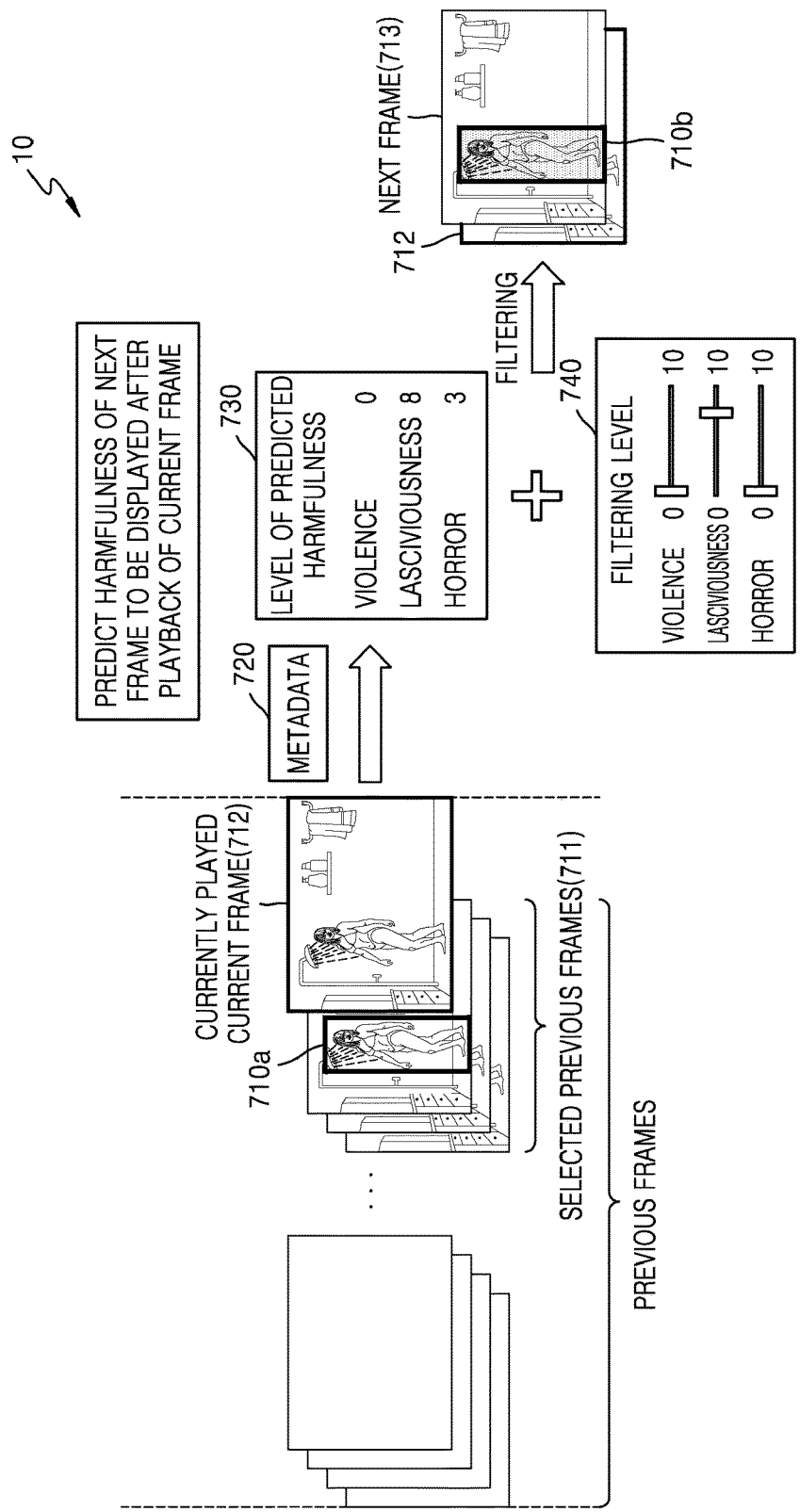
FIG. 7 illustrates an example where metadata regarding a harmful region of a previous frame is generated according to an embodiment of the present disclosure.

FIG. 7 illustrates an example where metadata regarding a harmful region of a previous frame is generated according to an embodiment of the present disclosure.

In the following description, a description that overlaps that of FIG. 4 will not be provided for convenience.

Referring to FIG. 7, the device 10 may determine a partial region of selected previous frames 711 as a harmful region 710a including harmful content. In an embodiment, the device 10 may determine a partial region of the selected previous frames 711 as the harmful region 710a including harmful content, by extracting image characteristics of the selected previous frames 711. The current frame 712 that is being played is shown in FIG. 7.

If a plurality of categories related to harmfulness are set, the device 10 may determine a partial region of the previous frames 711 including harmful content indicated by the plurality of categories as the harmful region 710a. For example, if as a plurality of categories, the 'lasciviousness' and 'horror' categories are set, the device 10 may determine a partial region of the previous frames 711 including harmful content related to 'lasciviousness' and 'horror' as the harmful region 710a. The device 10 may determine the harmful region 710a including harmful content differently according to types of the plurality of set categories.

To expect harmfulness of the next frame 713, the device 10 generates metadata 720 regarding the harmful region 710a in place of metadata regarding the entire region of the previous frames 711. The device 10 expects a harmfulness level 730 of a harmful region 710b of the next frame 713 based on the generated metadata 720 and compares the expected filtering level 730 with a filtering level 740. In an embodiment, the device 10 compares the expected harmfulness level 730 and the filtering level 740 for the same category with each other.

If the expected harmfulness level 730 of the harmful region 710b of the next frame 713 is higher than the filtering level 740, the device 10 filters the entire next frame 713 or the harmful region 710b of the next frame 713. For example, the device 10 may filter the next frame 713 by blurring or darkening the entire region or the harmful region 710b of the next frame 713.

Figure 8:
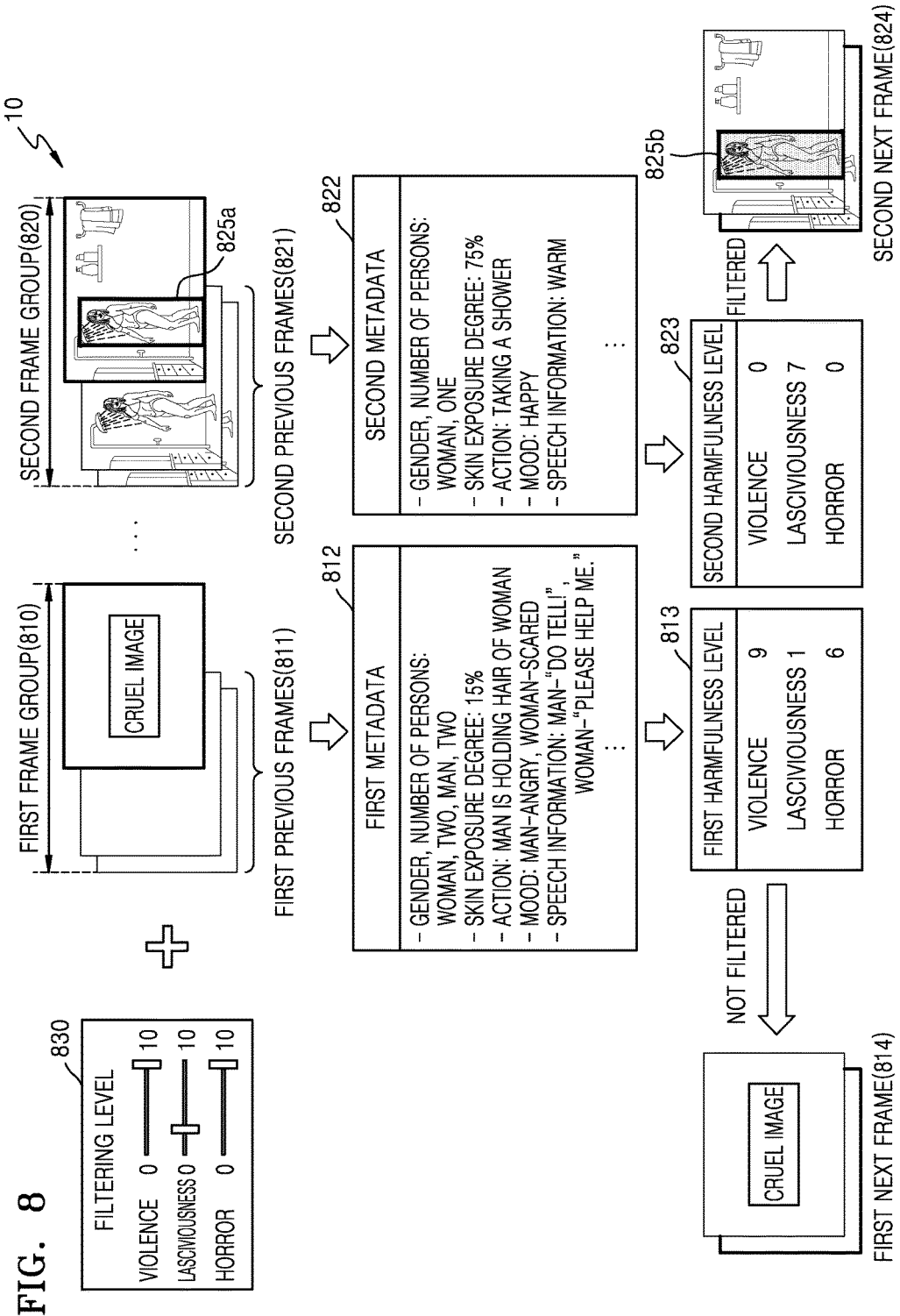
FIG. 8 illustrates an example where a next frame is filtered based on metadata according to an embodiment of the present disclosure.

FIG. 8 illustrates an example where a next frame is filtered based on metadata according to an embodiment of the present disclosure.

A description will not be provided if it overlaps with the description provided above.

Referring to FIG. 8, in an embodiment, video played on the device 10 may include a frame group 810 including a cruel scene and a second frame group 820 including a lascivious scene. The first frame group 810 and the second frame group 820 may include a plurality of adjacent previous frames having similarity, which are selected based on a data variation between adjacent previous frames included in the video. A filtering level 830 for the 'lasciviousness' category may be set low, and the filtering level 830 for the 'violence' and 'horror' categories may be set high. For example, if the filtering level 830 for each category is set to an integer value of 0 through 10, the filtering level 830 may be set to 'violence: 10, lasciviousness: 3, horror: 10'. In this case, first and second next frames 814 and 824 may be filtered if harmfulness levels 813 and 823 for the 'lasciviousness' category are determined to be 3 through 10 or the harmfulness levels 813 and 823 for the 'violence' and 'horror' categories are determined to be 10.

In an embodiment, the device 10 generates first metadata 812 regarding first previous frames 811 included in the first frame group 810. In an embodiment, the device 10 generates second metadata 822 regarding second previous frames 821 included in the second frame group 820.

For example, as the first metadata 812 regarding the first previous frames 811 including a cruel scene, information 'gender, the number of persons: woman, two, man, two, a skin exposure degree: 15%, an action: the man is holding the hair of the woman, mood: man-angry, woman-scared, speech information: man-"Do tell!" woman-"Please help me."', etc., may be generated. For example, as the second metadata 822 regarding the second previous frames 821 including a lascivious scene, information 'gender, the number of persons: woman, one, a skin exposure degree: 75%, an action: taking a shower, a mood: happy, speech information: "Warm."', etc., may be generated.

In an embodiment, the device 10 expects harmfulness of the first next frame 814 and the second next frame 824 based on the generated first metadata 812 and second metadata 822. In an embodiment, the device 10 may expect harmfulness of the first and second next frames 814 and 824 for each of the 'lasciviousness', 'violence', and 'horror' categories.

For example, based on the first metadata 812, a first harmfulness level 813 of the first frame group 810 including a cruel scene may be expected for each category as 'violence: 9, lasciviousness: 1, horror: 6' as the harmfulness level of the next frame 413 for each category. Based on the second metadata 822, a second harmfulness level 823 of the second frame group 820 including a lascivious scene may be expected for each category as 'violence: 0, lasciviousness: 7, horror: 0' as the harmfulness level of the next frame 413 for each category.

The device 10 determines whether to filter the next frame by comparing an expected harmfulness level of the next frame with a preset filtering level. In an embodiment, the device 10 compares the expected first harmfulness level 813 of the first next frame 814 with the preset filtering level 830. The device 10 also compares the expected second harmfulness level 823 of the second next frame 824 with the preset filtering level 830.

For example, if the first harmfulness level 813 is expected as 'violence: 9, lasciviousness: 1, horror: 6' and thus is lower than the preset filtering level 830 violence: 10, lasciviousness: 7, horror: 10' in values corresponding to all of the harmfulness categories, the device 10 may not filter the first next frame 814. If the second harmfulness level 823 is expected as 'violence: 0, lasciviousness: 7, horror: 0' and thus is higher than the preset filtering level 830 in a value corresponding to the 'lasciviousness' category, then the device 10 may filter the second next frame 824.

If a partial region of the second previous frames 821 is determined as a harmful region 825a, the device 10 may filter the harmful region 825b corresponding to the second next frame 824.

In an embodiment, the device 10 may filter the next frame 824 by blurring or darkening the entire region or a harmful region 825b of the second next frame 824.

Figure 9:
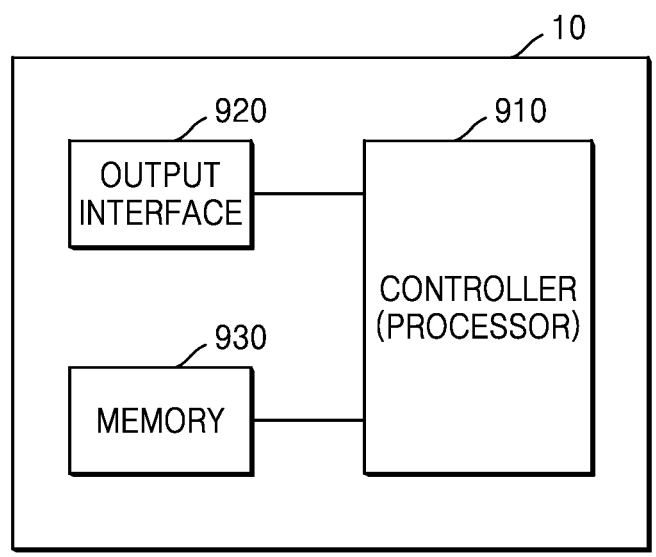
FIGS. 9 and 10 are block diagrams of a device according to various embodiments of the present disclosure.
Figure 10:
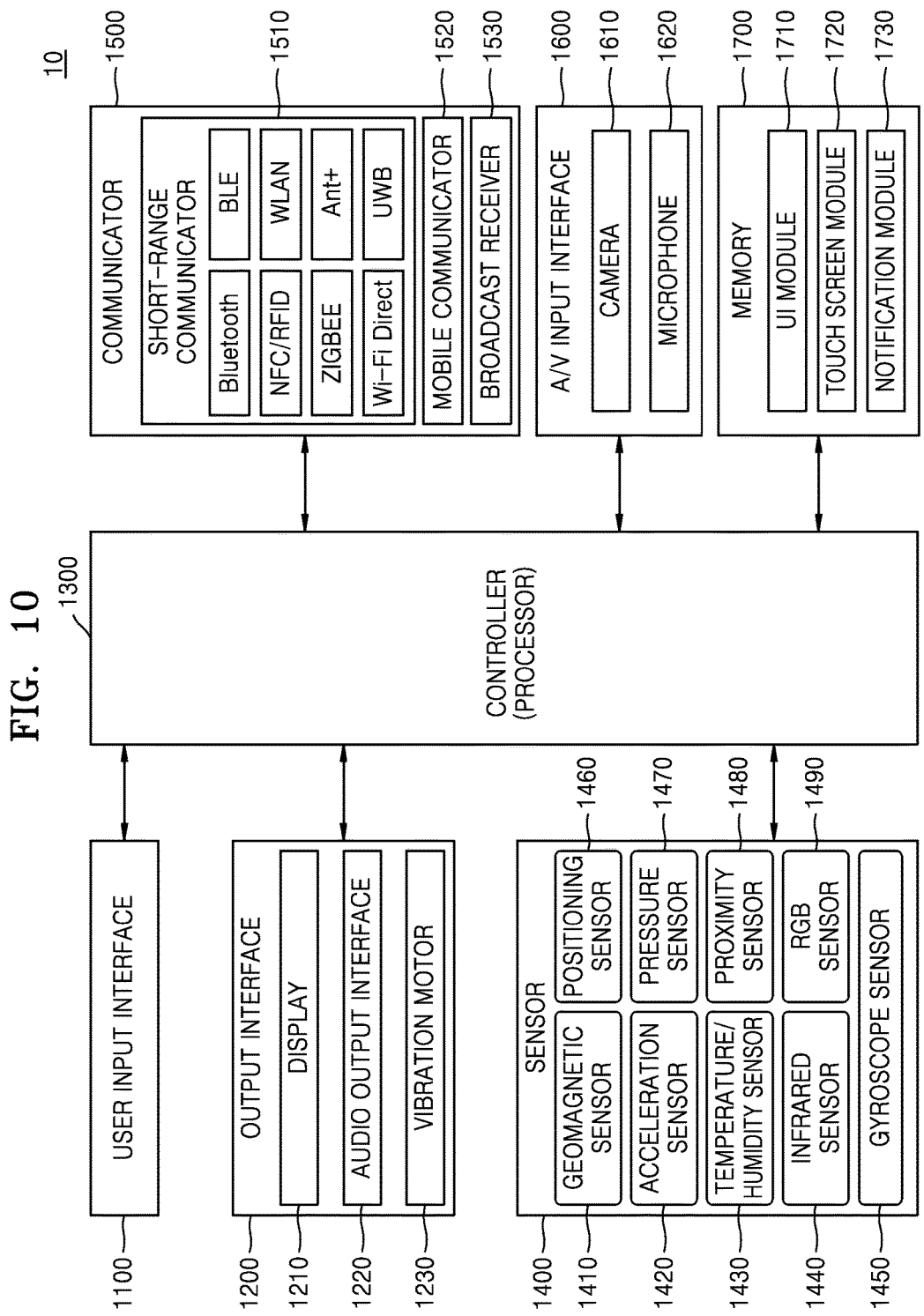

FIGS. 9 and 10 are block diagrams of a device according to various embodiments of the present disclosure.

Referring to FIG. 9, a device 10 according to an embodiment may include a controller 910, an output interface 920, and a memory 930. However, all of the elements shown in FIG. 9 are not essential elements of the device 10. More elements or less elements than those shown in FIG. 9 may be used to implement the device 10.

For example, as shown in FIG. 9, the device 10 according to an embodiment may further include an input interface 1100, a communicator 1500, a sensor 1400, and an audio/video (A/V) input interface 1600 in addition to the controller 1300 and the output interface 1200.

The user input interface 1100 is a means through which a user inputs data for controlling the device 10. For example, the user input interface 1100 may include, but not limited to, a keypad, a dome switch, a touch pad (a capacitive overlay type, a resistive overlay type, an infrared beam type, a surface acoustic wave type, an integral strain gauge type, a piezoelectric effect type, etc.), a jog wheel, a jog switch, etc.

The user input interface 1100 receives a user input for setting a preset harmfulness-related category and a user input for changing a category-specific filtering level.

The output interface 1200 outputs an audio signal, a video signal, or a vibration signal, and may include a display 1210, an audio output interface 1220, and a vibration motor 1230.

The display 1210 displays information processed by the device 10. For example, the display 1210 may display frames included in video input to the device 10 or may display a filtered next frame.

When the display 1210 and a touch pad are constructed as a touch screen in a layer structure, the display 1210 may be used as an input device as well as an output device. The display 1210 may include at least one of a liquid crystal display (LCD), a thin film transistor (TFT) LCD, an organic light-emitting diode (OLED), a flexible display, a three-dimensional (3D) display, and an electrophoretic display. According to implementation types of the device 10, the device 10 may include two or more displays 1210. In this case, the two or more displays 1210 may be disposed to face each other by using a hinge.

The audio output interface 1220 outputs audio data received from the communicator 1500 or stored in the memory 1700. The audio output interface 1220 outputs an audio signal related to a function (e.g., a call signal receiving sound, a message receiving sound, an alarm sound, etc.) performed in the device 10. The audio output interface 1220 may include a speaker, a buzzer, or the like.

The vibration motor 1230 outputs a vibration signal. For example, the vibration motor 1230 may output a vibration signal corresponding to output of audio data or video data (e.g., a call signal receiving sound, a message receiving sound, etc.). The vibration motor 1230 outputs a vibration signal if a touch is input to a touch screen.

The controller 1300 controls an overall operation of the device 10. For example, the controller 1300 may control in overall the user input interface 1100, the output interface 1200, the sensor 1400, the communicator 1500, and the A/V input interface 1600 by executing programs stored in the memory 1700.

The controller 1300 performs operations of the device 10 disclosed in FIGS. 1 to 4, 5A to 5C, 6 to 8, and 11 to 14.

More specifically, the controller 1300 selects at least one of previous frame preceding a currently played current frame from among frames included in video. In an embodiment, the controller 1300 may select a plurality of adjacent previous frames having similarity, based on a data variation between adjacent previous frames included in the video.

The controller 1300 generates metadata regarding the selected previous frame. In an embodiment, the controller 1300 may generate the metadata based on at least one of image information, speech information, and text information included in the selected previous frame.

In an embodiment, the controller 1300 may determine a partial region of the selected previous frame as a harmful region including harmful content. The controller 1300 generates metadata regarding the harmful region that is the partial region of the previous frame.

The controller 1300 expects harmfulness of at least one next frame to be displayed on the device after playback of the current frame, based on the generated metadata.

The controller 1300 filters the next frame based on the expected harmfulness. In an embodiment, the controller 1300 filters the next frame by comparing an expected harmfulness level of the next frame with a preset filtering level. If the harmfulness of the next frame is expected for each of the plurality of categories, the controller 1300 filters the next frame by comparing the harmfulness level and the filtering level for the same category with each other. In an embodiment, the controller 1300 filters the next frame if the expected harmfulness level of the next frame is higher than or equal to a preset filtering level.

The controller 1300 provides a GUI for setting a category for expecting harmfulness of a next frame. The controller 1300 changes a preset filtering level for a category based on a user input. The controller 1300 may filter the next frame by comparing a harmfulness level and a filtering level of the next frame for a newly added category. The controller 1300 may filter the next frame by comparing the changed filtering level and harmfulness level for the particular category with each other.

The controller 1300 compares an expected harmfulness level of the next frame with a preset filtering level. In an embodiment, the controller 1300 determines whether an expected harmfulness level for at least one category is higher than a preset filtering level. If determining that the expected harmfulness level for at least one category is not higher than the preset filtering level, the controller 1300 does not filter the next frame. If determining that the expected harmfulness level for at least one category is higher than the preset filtering level, the controller 1300 filters the next frame.

The sensor 1400 senses a state of the device 10 or a state around the device 10, and delivers sensed information to the controller 1300.

The sensor 1400 may include, but not limited to, at least one of a magnetic sensor 1410, an acceleration sensor 1420, a temperature/humidity sensor 1430, an infrared sensor 1440, a gyroscope sensor 1450, a positioning sensor (e.g., a global positioning system (GPS)) 1460, a pressure sensor 1470, a proximity sensor 1480, and a red/green/blue (RGB) sensor (or an illuminance sensor) 1490. A function of each sensor may be intuitively construed from a name of each sensor by those of ordinary skill in the art, and thus will not be described in detail.

Meanwhile, the communicator 1500 may include one or more elements that enable communication between the device 10 and the external device (not shown). For example, the communicator 1500 may include a short-range wireless communication unit 1510, a mobile communication unit 1520, and a broadcasting reception unit 1530.

The short-range wireless communication unit 1510 may include, but not limited to, a Bluetooth low energy (BLE) communication unit, a near field communication (NFC) unit, a wireless local area network (WLAN) communication unit or Wi-Fi communication unit, a ZigBee communication unit, an infrared data association (IrDA) communication unit, a Wi-Fi direct (WFD) communication unit, an ultra-wideband (UWB) communication unit, and an Ant+ communication unit.

The mobile communication unit 1520 transmits and receives a radio signal to and from at least one of a base station, an external terminal, and a server over a mobile communication network. Herein, the radio signal may include various forms of data corresponding to transmission/reception of a voice call signal, a video communication call signal, or a text/multimedia message.

The broadcasting reception unit 1530 receives a broadcast signal and/or broadcasting-related information from an external source through a broadcasting channel. The broadcasting channel may include a satellite channel and a terrestrial channel According to implementation examples, the device 10 may not include the broadcasting reception unit 1530.

The communicator 1500 transmits and receives information necessary for expectation of harmfulness of a next frame to and from a head-mounted display (HMD) device (not shown), a server (not shown), and a peripheral device (not shown).

The A/V input interface 1600 inputs an audio signal or a video signal, and may include a camera 1610, a microphone 1620, and so forth. The camera 1610 obtains an image frame such as a still image or a moving image in a video communication mode or a photographing mode through an image sensor. The image captured by the image sensor is processed by the controller 1300 or a separate image processor (not shown).

An image frame processed by the camera 1610 is stored in the memory 1700 or transmitted to an external source through the communicator 1500. Two or more cameras 1610 may be provided according to a structure aspect of the device.

The microphone 1620 receives an external audio signal and processes the received signal into electric voice data. For example, the microphone 1620 may receive an audio signal from an external device or a speaker. The microphone 1620 uses various noise cancellation algorithms for canceling noise generated during reception of the external audio signal.

The memory 1700 stores programs for processing and control of the controller 1300 and data input to or output from the device 10.

The memory 1700 may include a storage medium of at least one type of a flash memory type, a hard disk type, a multimedia card micro type, a card type memory (e.g., a secure digital (SD) or extreme digital (XD) memory, etc.), a random-access memory (RAM), a static RAM (SRAM), a read-only memory (ROM), an electrically erasable programmable ROM (EEPROM), a programmable ROM (PROM), a magnetic memory, a magnetic disk, an optical disk, and so forth.

The programs stored in the memory 1700 may be classified into a plurality of modules depending on a function thereof, e.g., a user interface (UI) module 1710, a touch screen module 1720, a notification module 1730, and so forth.

The UI module 1710 provides a specialized UI or graphic UI (GUI) interworking with the first device 1000 for each application. The touch screen module 1720 senses a touch gesture of a user on a touch screen and delivers information about the touch gesture to the controller 1300. The touch screen module 1720 according to some embodiments recognizes and analyzes a touch code. The touch screen module 1720 is configured with separate hardware including a controller.

To sense a touch or proximity touch on the touch screen, various sensors may be provided inside or near the touch screen. An example of the sensor for sensing a touch on the touch screen may be a tactile sensor. The tactile sensor refers to a sensor that senses a touch by a particular object to the extent or larger to which a person feels the touch. The tactile sensor senses a lot of information such as the roughness of a contact surface, the hardness of a contact object, the temperature of a contact point, etc.

An example of the sensor for sensing a touch on the touch screen may be a proximity sensor.

The proximity sensor refers to a sensor that detects existence or absence of an object that approaches or is in proximity to a detection surface by using the force of an electromagnetic field or infrared rays, without a mechanical contact. Examples of the proximity sensor may include a transmission optoelectronic sensor, a direct reflective optoelectronic sensor, a mirror reflective optoelectronic sensor, a radio frequency oscillation proximity sensor, an electrostatic capacity proximity sensor, a magnetic proximity sensor, an infrared proximity sensor, and so forth. The user's touch gesture may include a tap, a touch & hold, a double tap, a drag, panning, a flick, a drag & drop, a swipe, and so forth.

The notification module 1730 generates a signal for notifying of an occurrence of an event of the first device 1000. Examples of the event occurring in the first device 1000 may include key signal input, and so forth. The notification module 1730 outputs a notification signal in the form of a video signal through the display 1210, in the form of an audio signal through the audio output interface 1220, and/or in the form of a vibration signal through the vibration motor 1230.

Figure 11:
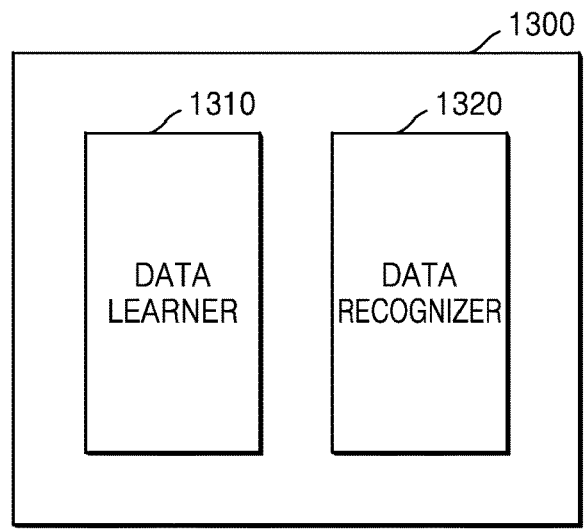
FIG. 11 is a block diagram of a controller according to an embodiment of the present disclosure

FIG. 11 is a block diagram of a controller according to an embodiment of the present disclosure.

Referring to FIG. 11, the controller 1300 may include a data learner 1310 and a data recognizer 1320.

The data learner 1310 learns a criterion for predicting harmfulness of at least one next frame. In an embodiment, the data learner 1310 learns a criterion by using training video input to the data learner 1310. The data learner 1310 may learn a criterion regarding which data included in the training video is to be used to expect harmfulness of a next frame and regarding how to determine harmfulness of the next frame using data. The data learner 1310 obtains data to be used for learning and applies the obtained data to a data recognition model to be described later, thereby learning the criterion for expecting harmfulness of the next frame.

The data recognizer 1320 expects harmfulness of the next frame based on data. The data recognizer 1320 expects the harmfulness of the next frame from data by using the learned data recognition model. The data recognizer 1320 obtains data according to the criterion that is preset by learning and uses the data recognition model with the obtained data as an input value, thereby predicting the harmfulness of the next frame based on the data. A result output from the data recognition model with the obtained data as the input value may be used to update the data recognition model.

At least one of the data learner 1310 and the data recognizer 1320 may be manufactured in the form of at least one hardware chip and mounted on an electronic device. For example, at least one of the data learner 1310 and the data recognizer 1320 may be manufactured in the form of a dedicated hardware chip for artificial intelligence (AI), or may be manufactured as a part of an existing general-purpose processor (e.g., a central processing unit (CPU), or an application processor (AP)) or a dedicated graphic processor (e.g., a graphic processing unit (GPU)) and mounted on various electronic devices.

In this case, the data learner 1310 and the data recognizer 1320 may be mounted on one electronic device and on separate electronic devices. For example, one of the data learner 1310 and the data recognizer 1320 may be included in one electronic device, and the other may be included in a server. The data learner 1310 and the data recognizer 1320 may be connected in a wired or wireless manner, such that model information established by the data learner 1310 may be provided to the data recognizer 1320 or data input to the data recognizer 1320 may be provided to the data learner 1310 as additional learning data.

Meanwhile, at least one of the data learner 1310 and the data recognizer 1320 may be implemented with a software module. When at least one of the data learner 1310 and the data recognizer 1320 may be implemented with a software module (or a program module including an instruction), the software module may be stored in a non-transitory computer-readable medium. In this case, at least one software module is provided by an operating system (OS) or by an application. Alternatively, a part of the at least one software module may be provided by an OS and another part thereof may be provided by an application.

Figure 12:
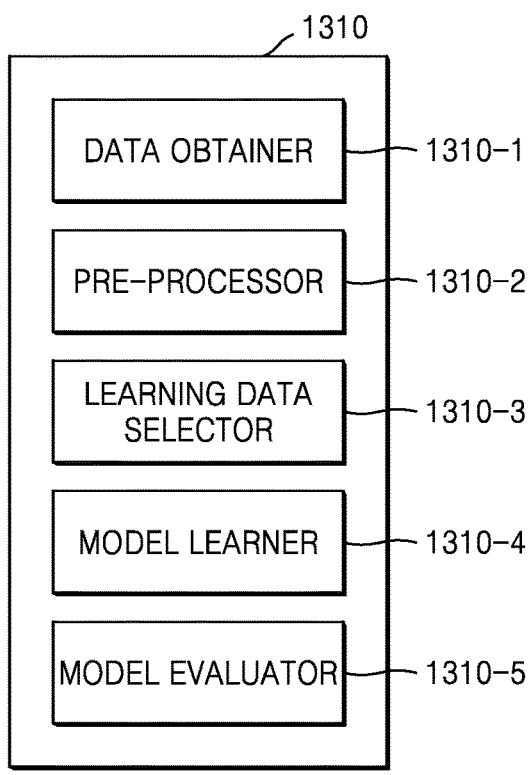
FIG. 12 is a block diagram of a learner according to an embodiment of the present disclosure.

FIG. 12 is a block diagram of a learner according to an embodiment of the present disclosure.

Referring to FIG. 12, the data learner 1310 according to some embodiments may include a data obtainer 1310-1, a pre-processor 1310-2, a learning data selector 1310-3, a model learner 1310-4, and a model evaluator 1310-5.

The data obtainer 1310-1 obtains data needed to expect harmfulness of a next frame.

The data obtainer 1310-1 receives training video to be used for obtaining data. The training video may include a plurality of images (or frames). For example, the data obtainer 1310-1 may receive video through a camera of an electronic device including the data learner 1310 or an external camera (e.g., a closed-circuit television (CCTV), a black box, etc.) capable of communicating with the electronic device including the data learner 1310. Herein, the camera may include one or more image sensors (e.g., a front sensor or a rear sensor), a lens, an image signal processor (ISP), or a flash (e.g., an LED, a xenon lamp, etc.).

For example, the data obtainer 1310-1 may obtain speech data, video data, text data, or biometric signal data included in the training video. The data obtainer 1310-1 may receive data through an input device (e.g., a microphone, a camera, a sensor, etc.) of the electronic device. Alternatively, the data obtainer 1310-1 obtains data through an external device capable of communicating with the electronic device.

The pre-processor 1310-2 pre-processes the obtained data, such that the obtained data may be used in learning for expecting harmfulness of the next frame. The pre-processor 1310-2 processes the obtained data into a preset format, such that the model learner 1310-4 may use the obtained data in learning for expecting harmfulness.

For example, the pre-processor 1310-2 extracts and identifies speech data, video data, text data, or biometric signal data included in the input training video, and cumulatively learns characteristics and result value extracted from the input data, thereby learning a criterion for expecting the harmfulness of the next frame. In this case, the pre-processor 1310-2 may extract and identify speech data, video data, text data, or biometric signal data of adjacent previous frames having similarity based on a data variation between adjacent previous frames included in the training video. The pre-processor 1310-2 may also extract and identify speech data, video data, text data, or biometric signal data regarding a harmful region that is a partial region of previous frames included in the input training video.

The learning data selector 1310-3 selects data needed for learning from pre-processed data. The selected data may be provided to the model learner 1310-4. The learning data selector 1310-3 selects data needed for learning from pre-processed data, according to a preset criterion for predicting harmfulness of the next frame. The learning data selector 1310-3 may also select data according to a criterion that is preset by learning of the model learner 1310-4.

The learning data selector 1310-3 selects data for predicting harmfulness of the next frame from the pre-processed data. If a category related to harmfulness is preset, the learning data selector 1310-3 selects data for predicting harmfulness of the next frame for each preset category.

The model learner 1310-4 learns a criterion regarding how to predict harmfulness of the next frame based on learning data. The model learner 1310-4 may also learn a criterion regarding which learning data is to be used to predict harmfulness of the next frame.

For example, if a plurality of categories related to harmfulness are set, the model learner 1310-4 may learn a criterion regarding the category 'lasciviousness', 'horror', or 'violence' category and a criterion regarding a harmfulness level in a specific harmfulness-related category.

The model learner 1310-4 learns a data recognition model used to predict harmfulness of the next frame using learning data. In this case, the data recognition model may be previously established. For example, the data recognition model may be previously established using input basic learning data (e.g., sample words, etc.).

The data recognition model may be established based on an application field of the recognition model, a purpose of learning, computer performance of a device, etc. The data recognition model may be based on, for example, a neural network. For example, a model such as, but not limited to, a deep neural network (DNN), a recurrent neural network (RNN), a bidirectional recurrent deep neural network (BRDNN), or the like may be used as the data recognition model.

Various embodiments, if there are a plurality of data recognition models established in advance, the model learner 1310-4 determines a data recognition model having a high correlation between input learning data and basic learning data as a data recognition model to be learned. In this case, the basic learning data may be classified in advance according to a data type, and the data recognition model may be established in advance for each data type. For example, the basic learning data may be classified depending on various criteria such as a region where learning data is generated, a time in which learning data is generated, a size of learning data, a genre of learning data, a generator of learning data, a type of an object in learning data, and so forth.

The model learner 1310-4 may learn the data recognition model using a learning algorithm such as error back-propagation or gradient descent.

The model learner 1310-4 causes the data recognition model to learn using supervised learning having learning data as an input value. The model learner 1310-4 may cause the data recognition model to learn using unsupervised learning in which the data recognition model discovers a criterion for predicting harmfulness of a next frame by learning a type of data needed for predicting the harmfulness of the next frame without separate supervision. The model learner 1310-4 learns the data recognition model using reinforcement learning based on a feedback regarding whether a prediction result of the harmfulness of the next frame based on learning is correct or not.

Once the data recognition model is learned, the model learner 1310-4 stores the learned data recognition model. In this case, the model learner 1310-4 stores the learned data recognition model in a memory of an electronic device including the data recognizer 1320. Alternatively, the model learner 1310-4 stores the learned data recognition model in a memory of an electronic device including the data recognizer 1320 to be described later. Alternatively, the model learner 1310-4 stores the learned data recognition model in a memory of a server wiredly or wirelessly connected with an electronic device.

In this case, the memory in which the learned data recognition model is stored may also store an instruction or data related to at least one other element of the electronic device. The memory may also store software and/or programs. The program may include a kernel, middleware, an application programming interface (API), and/or an application program (or "application"), and the like.

If a recognition result output after input of evaluation data to the data recognition model fails to satisfy a predetermined criterion, the model evaluator 1310-5 may cause the model learner 1310-4 to learn again. In this case, the evaluation data may be preset data for evaluating the data recognition model.

For example, the model evaluator 1310-5 may evaluate that the predetermined criterion is not satisfied if among recognition results of the learned data recognition model regarding evaluation data, the number or rate of evaluation data having inaccurate recognition results exceeds a preset threshold value. For the predetermined criterion being defined as a rate of 2%, if the learned data recognition model outputs wrong recognition results for 20 or more evaluation data among a total of 1000 evaluation data, then the model evaluator 1310-5 may evaluate that the learned data recognition model is not proper.

The evaluation data may be derived from a user's comment input. For example, the user may input a comment message indicating satisfaction or dissatisfaction with an output recognition result. The comment input may include user's feedback information regarding the output recognition result.

Meanwhile, if there are a plurality of learned data recognition models, the model evaluator 1310-5 evaluates whether each learned data recognition model satisfies the predetermined criterion, and determines a learned data recognition model satisfying the predetermined criterion as a final data recognition model. In this case, if a plurality of learned data recognition models satisfy the predetermined criterion, the model evaluator 1310-5 determines preset any one model or a predetermined number of models as a final data recognition model or final data recognition models in a higher evaluation grade order.

At least one of the data obtainer 1310-1, the pre-processor 1310-2, the learning data selector 1310-3, the model learner 1310-4, and the model evaluator 1310-5 may be manufactured in the form of at least one hardware chip and mounted on the electronic device. For example, at least one of the data obtainer 1310-1, the pre-processor 1310-2, the learning data selector 1310-3, the model learner 1310-4, and the model evaluator 1310-5 may be manufactured in the form of a dedicated hardware chip for AI, or may be manufactured as a part of an existing general-purpose processor (e.g., a CPU or an application processor (AP)) or a dedicated graphic processor (e.g., a GPU) and mounted on various electronic devices.

The data obtainer 1310-1, the pre-processor 1310-2, the learning data selector 1310-3, the model learner 1310-4, and the model evaluator 1310-5 may be mounted on one electronic device or on separate electronic devices, respectively. For example, some of the data obtainer 1310-1, the pre-processor 1310-2, the learning data selector 1310-3, the model learner 1310-4, and the model evaluator 1310-5 may be included in the electronic device or some others thereof may be included in a server.

At least one of the data obtainer 1310-1, the pre-processor 1310-2, the learning data selector 1310-3, the model learner 1310-4, and the model evaluator 1310-5 may be implemented with a software module. When at least one of the data obtainer 1310-1, the pre-processor 1310-2, the learning data selector 1310-3, the model learner 1310-4, and the model evaluator 1310-5 is implemented with a software module (or a program module including an instruction), the software module may be stored in a non-transitory computer-readable medium. In this case, at least one software module is provided by an OS or by an application. Alternatively, a part of the at least one software module may be provided by an OS and another part thereof may be provided by an application.

Figure 13:
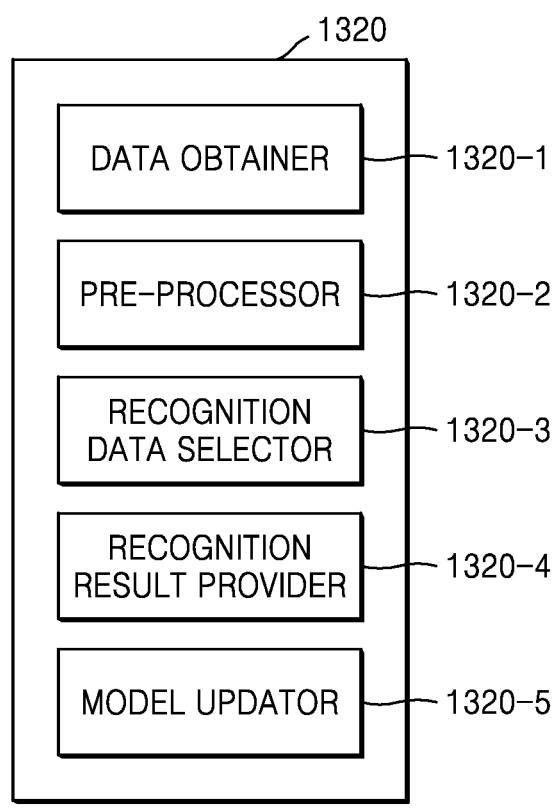
FIG. 13 is a block diagram of a data recognizer according to an embodiment of the present disclosure.

FIG. 13 is a block diagram of a data recognizer according to an embodiment of the present disclosure.

Referring to FIG. 13, the data recognizer 1320 according to some embodiments may include a data obtainer 1320-1, a pre-processor 1320-2, a recognition data selector 1320-3, a recognition result provider 1320-4, and a model updater 1320-5.

The data obtainer 1320-1 obtains data needed for predicting harmfulness of the next frame, and the pre-processor 1320-2 pre-processes the obtained data such that the data obtained for predicting the harmfulness of the next frame may be used. The pre-processor 1320-2 processes the obtained data into a preset format, such that the recognition result provider 1320-4 may use the data obtained for expecting harmfulness of the next frame.

The recognition data selector 1320-3 selects the data needed for predicting the harmfulness of the next frame from the pre-processed data. The selected data may be provided to the recognition result provider 1320-4. The recognition data selector 1320-3 selects the entire pre-processed data or a part thereof, according to a preset criterion for predicting harmfulness of the next frame. The recognition data selector 1320-3 may also select data according to a criterion that is preset by learning of the model learner 1310-4.

The recognition result provider 1320-4 applies the selected data to the data recognition model to predict the harmfulness of the next frame. The recognition result provider 1320-4 provides a recognition result based on a data recognition purpose. The recognition result provider 1320-4 applies the selected data to the data recognition model by using data selected by the recognition data selector 1320-3 as an input value. The recognition result may be determined by the data recognition model.

For example, a recognition result of video may be provided in the form of a text, audio, video, an image, or an instruction (e.g., an application execution instruction, a module function execution instruction, etc.). The recognition result may provide information about the next frame included in the video, such as 'lasciviousness', 'violence', and 'horror' in the form of a text, audio, video, an image, an instruction, etc.

The model updater 1320-5 updates the data recognition model based on evaluation with respect to the recognition result provided by the recognition result provider 1320-4. For example, the model updater 1320-5 provides the recognition result provided by the recognition result provider 1320-4 to the model learner 1310-4, allowing the model learner 1310-4 to update the data recognition model.

At least one of the data obtainer 1320-1, the pre-processor 1320-2, the recognition data selector 1320-3, the recognition result provider 1320-4, and the model updater 1320-5 may be manufactured in the form of at least one hardware chip and mounted on the electronic device. For example, at least one of the data obtainer 1320-1, the pre-processor 1320-2, the recognition data selector 1320-3, the recognition result provider 1320-4, and the model updater 1320-5 may be manufactured in the form of a dedicated hardware chip for AI, or may be manufactured as a part of an existing general-purpose processor (e.g., a CPU or an AP) or a dedicated graphic processor (e.g., a GPU) and mounted on various electronic devices.

The data obtainer 1320-1, the pre-processor 1320-2, the recognition data selector 1320-3, the recognition result provider 1320-4, and the model updater 1320-5 may be mounted on one electronic device or on separate electronic devices, respectively. For example, some of the data obtainer 1320-1, the pre-processor 1320-2, the recognition data selector 1320-3, the recognition result provider 1320-4, and the model updater 1320-5 may be included in the electronic device or some others thereof may be included in a server.

At least one of the data obtainer 1320-1, the pre-processor 1320-2, the recognition data selector 1320-3, the recognition result provider 1320-4, and the model updater 1320-5 may be implemented with a software module. When at least one of the data obtainer 1320-1, the pre-processor 1320-2, the recognition data selector 1320-3, the recognition result provider 1320-4, and the model updater 1320-5 is implemented with a software module (or a program module including an instruction), the software module may be stored in a non-transitory computer-readable medium. In this case, at least one software module is provided by an OS or by an application. Alternatively, a part of the at least one software module may be provided by an OS and another part thereof may be provided by an application.

Figure 14:
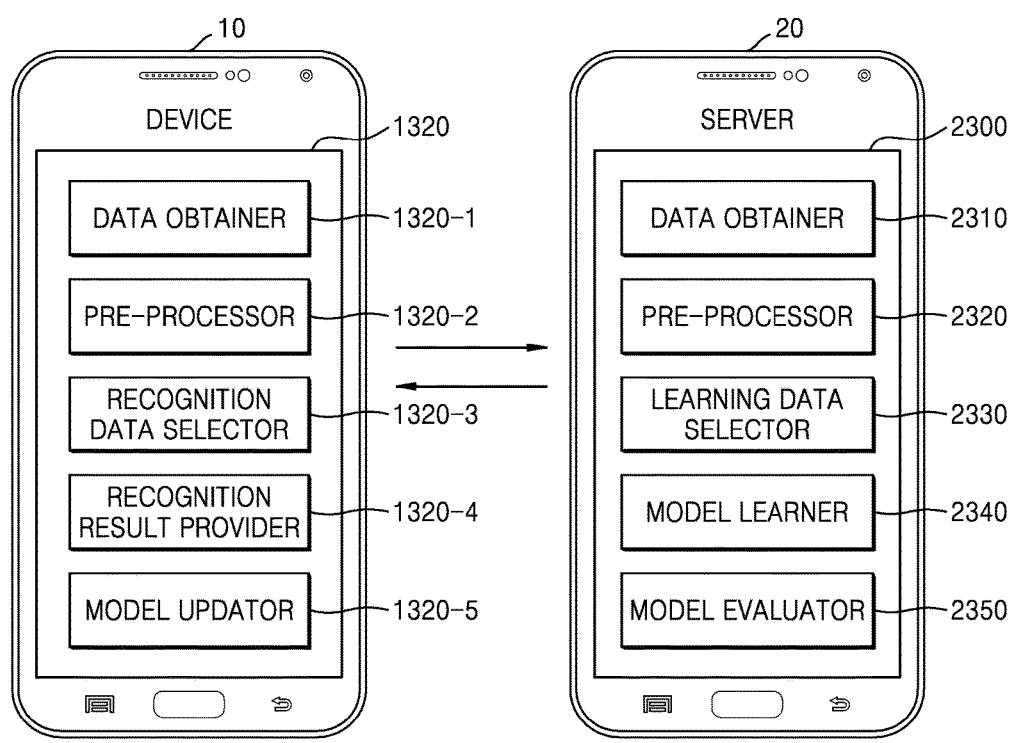
FIG. 14 illustrates an example where a device and a server learn and recognize data by interworking with each other according to an embodiment of the present disclosure.

FIG. 14 illustrates an example where a device and a server learn and recognize data by interworking with each other, according to an embodiment of the present disclosure.

Referring to FIG. 14, a server 20 learns a criterion for predicting harmfulness of the next frame, and the device 10 predicts the harmfulness of the next frame based on a learning result by the server 20. The server 20 includes a data recognizer 2300, which may include a data obtainer 2310, pre-processor 2320, learning data selector 2330, model learner 2340 and model evaluator 2350.

In this case, a model learner 2340 of the server 20 performs functions of the data learner 1310 shown in FIG. 11. The model learner 2340 of the server 20 may learn a criterion regarding which data is to be used to expect harmfulness of the next frame and regarding how to predict harmfulness of the next frame using data. The model learner 2340 obtains data to be used for learning and applies the obtained data to a data recognition model to be described later, thereby learning the criterion for expecting harmfulness of the next frame.

The recognition result provider 1320-4 of the device 10 predicts the harmfulness of the next frame by applying the data selected by the recognition data selector 1320-3 to the data recognition model generated by the server 20. For example, the recognition result provider 1320-4 of the device 10 may transmit the data selected by the recognition data selector 1320-3 to the server 20 and request the server 20 to predict the harmfulness of the next frame by applying the data selected by the recognition data selector 1320-3 to the recognition model. The recognition result provider 1320-4 receives information about the harmfulness of the next frame, predicted by the server 20, from the server 20.

For example, the device 10 may generate metadata regarding a previous frame and transmit the metadata to the server 20. The device 10 receives information about the predicted harmfulness of the next frame from the server 20.

The recognition result provider 1320-4 of the device 10 receives the recognition model generated by the server 20 and predicts the harmfulness of the next frame by using the received recognition model. In this case, the recognition result provider 1320-4 of the device 10 predicts the harmfulness of the next frame by applying the data selected by the recognition data selector 1320-3 to the data recognition model received from the server 20.

An embodiment may be implemented with a recording medium including a computer-executable command such as a computer-executable programming module. A computer-readable recording medium may be an available medium that is accessible by a computer, and includes all of a volatile medium, a non-volatile medium, a separated medium, and a non-separated medium. The computer-readable recording medium may also include both a computer storage medium and a communication medium. The computer storage medium includes all of a temporary medium, a non-temporary medium, a separated medium, and a non-separated medium, which is implemented by a method or technique for storing information such as a computer-readable command, a data structure, a programming module, or other data. The communication medium includes a computer-readable command, a data structure, a programming module, or other data of a modulated data signal like carriers, or other transmission mechanisms, and includes an information delivery medium.

In the specification, the term "unit" may be a hardware component like a processor or a circuit, and/or a software component executed by a hardware component like a processor.

Those of ordinary skill in the art to which the present disclosure pertains will appreciate that the present disclosure may be implemented in different detailed ways without departing from the technical spirit or essential characteristics of the present disclosure. Accordingly, the aforementioned embodiments should be construed as being only illustrative, but should not be constructed as being restrictive from all aspects. For example, each element described as a single type may be implemented in a distributed manner, and likewise, elements described as being distributed may be implemented as a coupled type.

The scope of the present disclosure is defined by the following claims rather than the detailed description, and the meanings and scope of the claims and all changes or modified forms derived from their equivalents should be construed as falling within the scope of the present disclosure.

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of filtering video by a device, the method comprising:
    selecting, by at least one processor, at least one previous frame preceding a current frame being played from among a plurality of frames included in a video being played without filtering the current frame being played;
    analyzing, by the at least one processor, at least one of image information or speech information included in the selected at least one previous frame, while the video is being played;
    generating, by the at least one processor, metadata based on the analysis of the selected at least one previous frame, while the video is played;
    predicting, by the at least one processor, harmfulness of at least one next frame to be displayed on the device, after playback of the current frame based on the generated metadata corresponding to the at least one previous frame, while the video is being played; and
    filtering, by the at least one processor, the at least one next frame based on the predicted harmfulness, while the video is being played.

2. The method of claim 1, wherein the predicting of the harmfulness of the at least one next frame comprises predicting the harmfulness of the at least one next frame for each of a plurality of categories for predicting the harmfulness.

3. The method of claim 2, wherein the predicting of the harmfulness of the at least one next frame further comprises:
    providing a graphic user interface (GUI) for setting a category for predicting the harmfulness,
    receiving a user input with respect to the provided GUI, and
    setting a new category related to the harmfulness according to the received input.

4. The method of claim 1, wherein the filtering of the at least one next frame comprises:
    comparing a level of the predicted harmfulness with a preset filtering level, and
    filtering the at least one next frame based on a result of the comparison.

5. The method of claim 4, further comprising:
    changing, by the at least one processor, the preset filtering level based on a user input,
    wherein the comparing comprises comparing the level of the predicted harmfulness with the changed filtering level.

6. The method of claim 1, wherein the generating of the metadata comprises:
    determining a partial region of the selected at least one previous frame as a harmful region comprising harmful content, and
    generating the metadata for determining harmfulness of the harmful region.

7. The method of claim 1, wherein the generating of the metadata comprises generating the metadata based on text information included in the selected at least one previous frame.

8. The method of claim 1, wherein the selecting of the at least one previous frame comprises selecting one or more adjacent previous frames having similarity based on a data variation between the one or more adjacent previous frames included in the video.

9. The method of claim 1, wherein the filtering of the at least one next frame comprises lowering visibility of the at least one next frame or a partial region of the at least one next frame.

10. A device for filtering video, the device comprising:
    a display configured to play the video;
    a memory configured to store at least one instruction; and
    at least one processor, wherein the at least one processor, by executing the at least one instruction, is configured to:
        select at least one previous frame preceding a current frame being played from among a plurality of frames included in a video being played,
        analyze at least one of image information or speech information included in the selected at least one previous frame, while the video is being played,
        generate metadata based on the analysis of the selected at least one previous frame, while the video is played,
        predict harmfulness of at least one next frame to be displayed on the device after playback of the current frame; based on the generated metadata corresponding to the at least one previous frame, while the video is being played, and filter the at least one next frame based on the predicted harmfulness, while the video is being played.

11. The device of claim 10, wherein the at least one processor is further configured to predict the harmfulness of the at least one next frame for each of a plurality of categories for predicting the harmfulness.

12. The device of claim 11, wherein the at least one processor is further configured to:

provide a graphic user interface (GUI) for setting a category for predicting the harmfulness, receive a user input with respect to the provided GUI, and set a new category related to the harmfulness according to the received input.

13. The device of claim 10, wherein the at least one processor is further configured to:

compare a level of the predicted harmfulness with a preset filtering level, and filter the at least one next frame based on a result of the comparison.

14. The device of claim 13, wherein the at least one processor is further configured to:

change the preset filtering level based on a user input, and compare the level of the predicted harmfulness with the changed filtering level.

15. The device of claim 10, wherein the at least one processor is further configured to:

determine a partial region of the selected at least one previous frame as a harmful region comprising harmful content, and generate the metadata for determining harmfulness of the harmful region.

16. The device of claim 10, wherein the at least one processor is further configured to generate the metadata based on text information included in the selected at least one previous frame.

17. The device of claim 10, wherein the at least one processor is further configured to select adjacent previous frames having similarity based on a data variation between the selected adjacent previous frames included in the video.

18. The device of claim 10, wherein the at least one processor is further configured to lower visibility of the at least one next frame or a partial region of the at least one next frame.

19. A non-transitory computer-readable recording medium having recorded thereon a program for executing the method of claim 1 on a computer.

* * * * *